(12) United States Patent
Ke et al.

(10) Patent No.: US 11,524,743 B2
(45) Date of Patent: Dec. 13, 2022

(54) PEDAL MECHANISM AND HOUSING OF BALANCING VEHICLE

(71) Applicant: ZHEJIANG TAOTAO VEHICLES CO., LTD., Lishui (CN)

(72) Inventors: Qin Ke, Lishui (CN); Jianbing Wu, Lishui (CN); Haibo Zhu, Lishui (CN); Matao Cao, Lishui (CN)

(73) Assignee: ZHEJIANG TAOTAO VEHICLES CO., LTD., Lishui (CN)

( * ) Notice: Subject to any disclaimer, the term of this patent is extended or adjusted under 35 U.S.C. 154(b) by 479 days.

(21) Appl. No.: 16/744,899

(22) Filed: Jan. 16, 2020

(65) Prior Publication Data

US 2021/0197921 A1 Jul. 1, 2021

Related U.S. Application Data

(63) Continuation of application No. 16/731,955, filed on Dec. 31, 2019, now abandoned.

(51) Int. Cl.
*B62K 23/08* (2006.01)
*A63C 17/01* (2006.01)
*B62K 11/00* (2006.01)

(52) U.S. Cl.
CPC ............ *B62K 23/08* (2013.01); *A63C 17/016* (2013.01); *B62K 11/007* (2016.11); *B62K 2202/00* (2013.01)

(58) Field of Classification Search
CPC .. B62K 23/08; B62K 11/007; B62K 2202/00; A63C 17/016
See application file for complete search history.

(56) References Cited

U.S. PATENT DOCUMENTS

| | | | | |
|---|---|---|---|---|
| 9,376,155 B2* | 6/2016 | Ying | ................... | B62D 51/02 |
| 9,452,802 B2* | 9/2016 | Ying | ................... | B62K 11/007 |
| 9,840,302 B2* | 12/2017 | Zeng | ................... | B62K 11/007 |
| 9,957,011 B2* | 5/2018 | Jiang | ................... | B62K 11/007 |
| 10,167,037 B2* | 1/2019 | Ying | ................... | B62D 51/02 |
| 10,486,764 B2* | 11/2019 | Ying | ................... | B62D 51/02 |
| 10,787,218 B2* | 9/2020 | Wen | ................... | B62J 11/19 |
| 10,933,937 B2* | 3/2021 | Shang | ................... | B62K 11/007 |
| 11,077,909 B2* | 8/2021 | Wang | ................... | B62K 11/007 |
| 11,203,390 B2* | 12/2021 | Wen | ................... | B62J 11/19 |
| 11,203,391 B2* | 12/2021 | Wen | ................... | B62J 11/19 |
| 11,260,905 B2* | 3/2022 | Ying | ................... | B62D 51/02 |

(Continued)

*Primary Examiner* — Jacob B Meyer
*Assistant Examiner* — Michael R Stabley
(74) *Attorney, Agent, or Firm* — Schwegman Lundberg & Woessner, P.A.

(57) ABSTRACT

The application relates to a pedal mechanism and a housing of a balancing vehicle. The pedal mechanism comprises a pedal body, and an internal framework is arranged inside the pedal body. A lower side of the pedal body is also formed with an induction probe for inducting a control system inside a balancing vehicle. A housing of the balancing vehicle comprises a pair of symmetrically arranged and relatively rotatable inner housings, the inner housings are connected with the upper housing, and the pedal mechanism installed at upper housing. The pedal body and the induction probe are integrally molded, which has the advantages of less multiple assembly processes, shorter processing time, higher precision, and not easy to fall off which strengthens the stability of the structure.

18 Claims, 3 Drawing Sheets

(56) References Cited

U.S. PATENT DOCUMENTS

| | | | |
|---|---|---|---|
| 11,358,048 B2* | 6/2022 | Zang | A63C 17/014 |
| 11,358,049 B2* | 6/2022 | Zang | A63C 17/014 |
| 2018/0037290 A1* | 2/2018 | Ying | B62D 51/02 |
| 2019/0077479 A1* | 3/2019 | Chen | B62K 11/007 |
| 2020/0354008 A1* | 11/2020 | Wang | B62J 43/16 |

* cited by examiner

PEDAL MECHANISM AND HOUSING OF BALANCING VEHICLE

PRIORITY CLAIM

The application is a continuation of and claims the benefit of priority to U.S. application Ser. No. 16/731,955, filed 31 Dec. 2019, which is incorporated herein by reference in its entirety.

BACKGROUND

Technical Field

The application relates to a technical field of balancing vehicle accessories, in particular to a pedal mechanism and a housing of a balance vehicle.

Description of the Related Art

With the improvement of people's living standards and the enhancement of environmental protection awareness, the balancing vehicle, as a walking tool, has been welcomed by more and more people for its simple structure and portability. The balancing vehicle on the market mainly include two types of one wheel and two wheels, the principle of its operation is mainly based on a basic principle called "dynamic balance", in which the two-wheeled balancing vehicle includes the inner housing body, the inner housing body is provided with a pedal mechanism, and the pedal mechanism includes a pair of pedals.

The pedal mechanism of the two-wheeled balancing vehicle on the market is composed of a left and a right pedal, and the two pedals are installed between the upper housing and the inner housing on the left and right sides, respectively. When installed, the pedal needs to be supported by a pedal support plate. In addition, a light sensing probe should be installed on the pedal to induct the control system on the main body of the inner housing, and the lower end of the light sensing probe also needs to be fixed by a fixing frame. As shown in FIG. 4, the specific installation structure is as follows:

The lower side of the pedal (91) is provided with a supporting plate (92), the lower surface of the supporting plate (92) is connected with a light sensing probe (94) through a clamping ring (93), and a fixing frame (95) is also connected to the light sensing probe (94). The assembly procedure of this kind of structure is tedious and complicated, and the pedal needs to be molded first, then stick it with the supporting plate with adhesive, and then install the light sensing probe on the support plate. The accuracy is not easy to control during installation, and the support plate is easy to fall off in the process of use.

BRIEF SUMMARY OF THE INVENTION

The purpose of the application is to provide a pedal mechanism with simple structure and less installation process and cost, a housing of a balancing vehicle provided with the pedal mechanism.

The purpose of the application is to realize like this:

The application relates to a pedal mechanism, the pedal mechanism includes a pedal body, an inner framework is arranged inside the pedal body, and a lower side of the pedal body is integrally formed with an induction probe for inducting a control system inside a balancing vehicle.

Optionally, the pedal body, the inner framework and the induction probe may be integrally molded by injection molding.

Optionally, an upper surface of the pedal body may be provided with an anti-skid stripe.

Optionally, an outer edge of the pedal body may be sunken downward to form a installing convex edge for installing at a housing of the balancing vehicle, and the installing convex edge may be fixedly connected with the housing of the balancing vehicle through a plurality of bolts or screws.

Optionally, the pedal body and the induction probe may be made of soft plastic, and the inner framework may be in a sheet structure and may be made of metal or rigid plastic.

Optionally, a plurality of buffer columns may be formed on a lower surface of the pedal body.

Optionally, the lower surface of the pedal body may be provided with a plurality of crisscross stiffeners, and each of the buffer column may be located at an intersection of the stiffeners.

This application also provides a housing of the balancing vehicle may include a pair of symmetrically arranged and relatively rotatable inner housings, and an upper housing may be connected with an upper side of the inner housing, the upper housing may be fitted with the pedal mechanism, the pedal mechanism may include a pedal body, an inner framework is arranged inside the pedal body, and a lower side of the pedal body may be integrally formed with an induction probe for inducting a control system inside a balancing vehicle.

Optionally, the outer edge of the pedal body may be sunken downward to form a installing convex edge, the upper housing may be formed with an installation groove corresponding to the installing convex edge, an upper surface of the installing convex edge may be fitted into the installation groove, and a lower surface of the installing convex edge may be fixed with a waterproof plate by bolts or screws.

Optionally, an upper surface of the pedal body may be provided with an anti-skid stripe.

Optionally, an outer edge of the pedal body may be sunken downward to form a installing convex edge for installing at a housing of the balancing vehicle, and the installing convex edge may be fixedly connected with the housing of the balancing vehicle through a plurality of bolts or screws.

Optionally, the pedal body and the induction probe may be made of soft plastic, and the inner framework may be in a sheet structure and may be made of metal or rigid plastic.

Optionally, a plurality of buffer columns may be formed on a lower surface of the pedal body.

This application also provides a housing of the balancing vehicle may include a pair of symmetrically arranged and relatively rotatable inner housings, and an upper housing may be connected with an upper side of the inner housing, the upper housing may be fitted with the pedal mechanism, the pedal mechanism may include a pedal body, an inner framework is arranged inside the pedal body, and a lower side of the pedal body may be integrally formed with an induction probe for inducting a control system inside a balancing vehicle;

the pedal body, the inner framework and the induction probe may be integrally molded by injection molding.

This application also provides a housing of the balancing vehicle may include a pair of symmetrically arranged and relatively rotatable inner housings, and an upper housing may be connected with an upper side of the inner housing, the upper housing may be fitted with the pedal mechanism, the pedal mechanism may include a pedal body, an inner framework is arranged inside the pedal body, and a lower side of the pedal body may be integrally formed with an induction probe for inducting a control system inside a balancing vehicle;

an upper surface of the pedal body may be provided with an anti-skid stripe.

This application also provides a housing of the balancing vehicle may include a pair of symmetrically arranged and relatively rotatable inner housings, and an upper housing may be connected with an upper side of the inner housing, the upper housing may be fitted with the pedal mechanism, the pedal mechanism may include a pedal body, an inner framework is arranged inside the pedal body, and a lower side of the pedal body may be integrally formed with an induction probe for inducting a control system inside a balancing vehicle;

an outer edge of the pedal body may be sunken downward to form a installing convex edge for installing at a housing of the balancing vehicle, and the installing convex edge may be fixedly connected with the housing of the balancing vehicle through a plurality of bolts or screws.

This application also provides a housing of the balancing vehicle may include a pair of symmetrically arranged and relatively rotatable inner housings, and an upper housing may be connected with an upper side of the inner housing, the upper housing may be fitted with the pedal mechanism, the pedal mechanism may include a pedal body, an inner framework is arranged inside the pedal body, and a lower side of the pedal body may be integrally formed with an induction probe for inducting a control system inside a balancing vehicle;

the pedal body and the induction probe may be made of soft plastic, and the inner framework may be in a sheet structure and may be made of metal or rigid plastic.

This application also provides a housing of the balancing vehicle may include a pair of symmetrically arranged and relatively rotatable inner housings, and an upper housing may be connected with an upper side of the inner housing, the upper housing may be fitted with the pedal mechanism, the pedal mechanism may include a pedal body, an inner framework is arranged inside the pedal body, and a lower side of the pedal body may be integrally formed with an induction probe for inducting a control system inside a balancing vehicle;

a plurality of buffer columns may be formed on a lower surface of the pedal body.

This application also provides a housing of the balancing vehicle may include a pair of symmetrically arranged and relatively rotatable inner housings, and an upper housing may be connected with an upper side of the inner housing, the upper housing may be fitted with the pedal mechanism, the pedal mechanism may include a pedal body, an inner framework is arranged inside the pedal body, and a lower side of the pedal body may be integrally formed with an induction probe for inducting a control system inside a balancing vehicle;

the lower surface of the pedal body may be provided with a plurality of crisscross stiffeners, and each of the buffer column may be located at an intersection of the stiffeners.

This application also provides a housing of the balancing vehicle may include a pair of symmetrically arranged and relatively rotatable inner housings, and an upper housing may be connected with an upper side of the inner housing, the upper housing may be fitted with the pedal mechanism, the pedal mechanism may include a pedal body, an inner framework is arranged inside the pedal body, and a lower side of the pedal body may be integrally formed with an induction probe for inducting a control system inside a balancing vehicle;

the lower surface of the pedal body may be provided with a plurality of crisscross stiffeners, and each of the buffer column may be located at an intersection of the stiffeners;

the outer edge of the pedal body may be sunken downward to form a installing convex edge, the upper housing may be formed with an installation groove corresponding to the installing convex edge, an upper surface of the installing convex edge may be fitted into the installation groove, and a lower surface of the installing convex edge may be fixed with a waterproof plate by bolts or screws.

Compared with the prior art, the application has the following technical effects:

1. The pedal body and the induction probe in this application are integrally molded. Compared with the prior art, this structure has the advantages of less multiple assembly processes, shorter processing time, higher precision, and not easy to fall off which strengthens the stability of the structure. At the same time, an internal framework is added inside the pedal body, which can ensure the flatness and stability of the pedal body when the user steps on.

2. In the process of the production, the inner framework is first put into the mold, and then the material is injected, so that the pedal body, the inner framework and the induction probe are formed at one time. As a result, the processing process is reduced, the cost is reduced, and the production efficiency is improved.

3. The pedal body is installed at the lower side of the upper housing by bolts or screws, and is provided with a waterproof plate, which is more stable than the connection by direct adhesive in the prior art, and also has good waterproof and sealing effect.

4. A plurality of buffer columns are formed on the lower surface of the pedal body, and the buffer column is also integrated with the pedaling body, the buffer columns are made of soft plastic, and the buffer columns will directly hit the inner housing made of aluminum. Compared with the prior art, the impact between the metal and the metal is changed with the impact between the soft plastic and the metal, which reduces the impact sound when the buffer columns is in contact with the aluminum plate, and also prolongs the service life of the device.

DETAILED DESCRIPTION OF THE INVENTION

Figure 1:
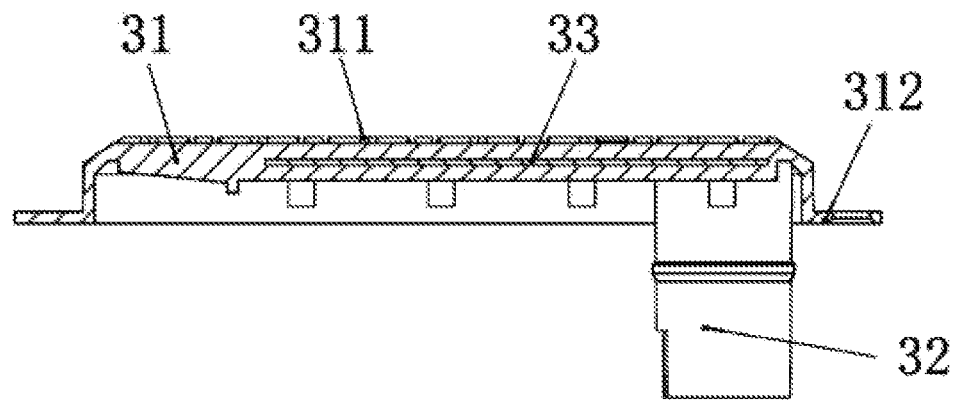
FIG. 1 is a sectional view of a pedal body of an embodiment in this application.
Figure 2:
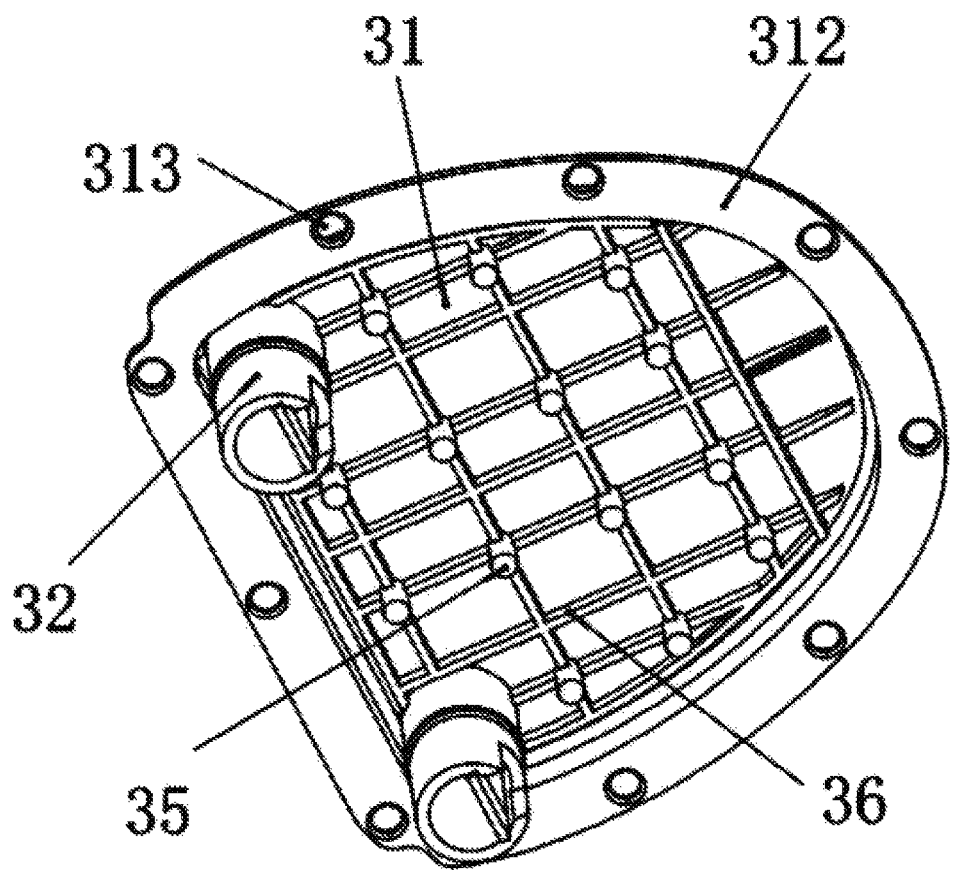
FIG. 2 is a structural schematic diagram of a pedal body of an embodiment in this application.
Figure 3:
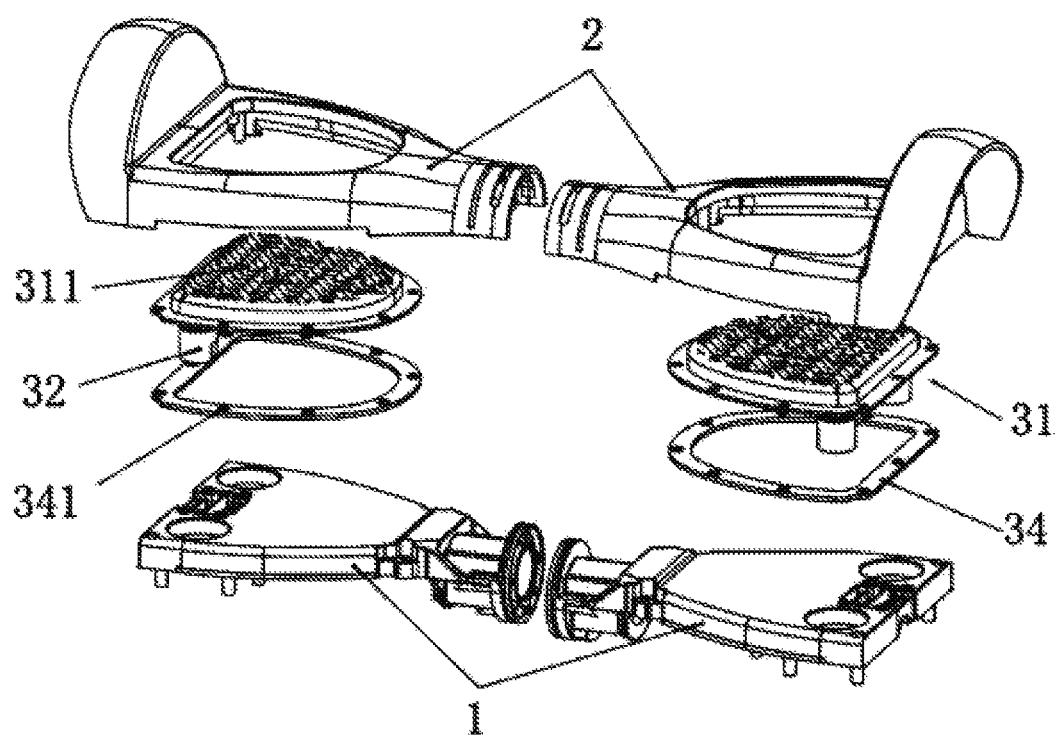
FIG. 3 is an explosive view of a connection structure of the balancing vehicle of an embodiment in this application.
Figure 4:
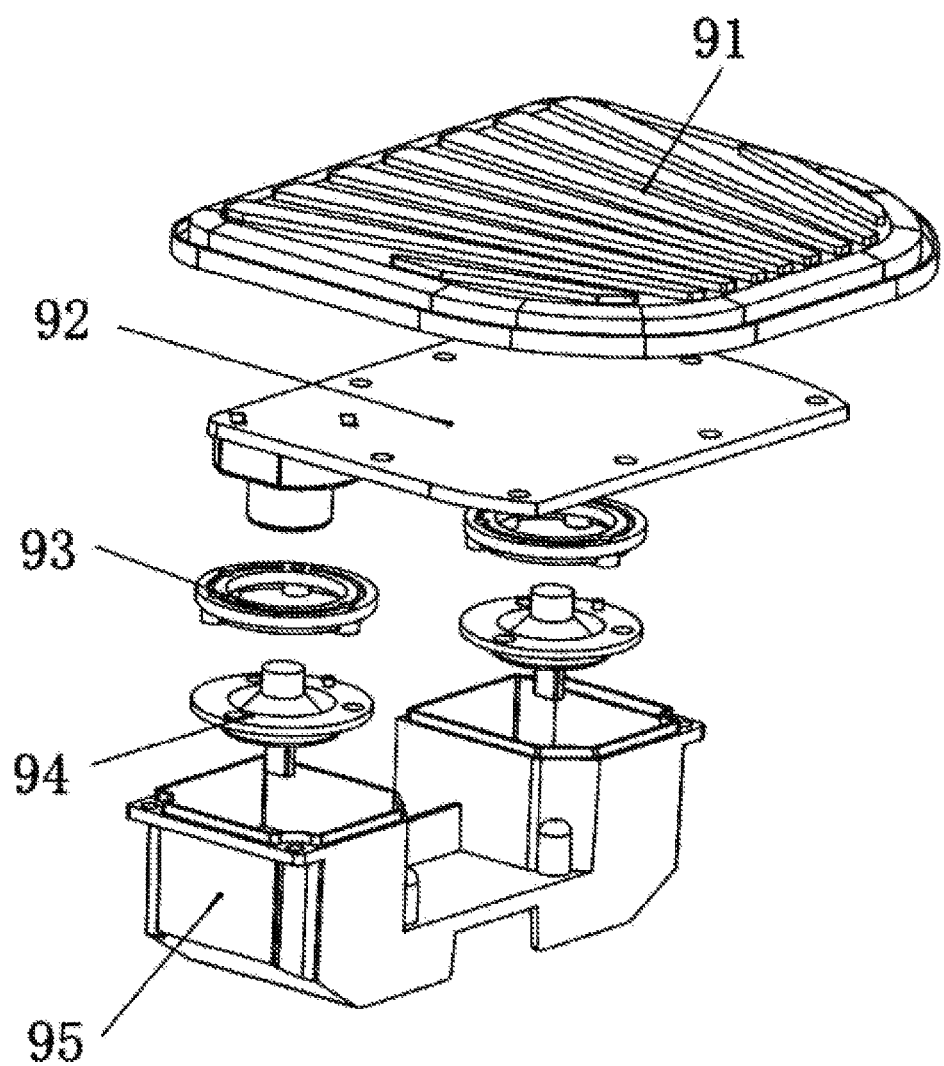
FIG. 4 is an explosive view of a connecting structure of the pedals in the prior art.

The application is further described in conjunction with the attached drawings with specific embodiments, as shown in FIGS. 1-3.

As shown in FIG. 1-3, a pedal mechanism includes a pedal body 31, wherein the pedal body 31 is internally provided with an inner framework 33, a lower side of the pedal body 31 is also integrated with an induction probe 32 inducting a control system inside the induction balancing vehicle. The induction probe 32 is contact structure acting as a key rather than an electronic component. The number of induction probe 32 can be one or two, or any other number. The induction probe 32 in the embodiment has for and are symmetrically arranged on two sides of the pedal body far away from the center of the pedal body. The induction probes on each side are also axially symmetrical.

The pedal body 31, the inner framework 33 and the induction probe 32 are integrally molded by injection molding, and the upper surface of the pedal body 31 is provided with an anti-skid stripe 311.

The pedal body 31 and the induction probe 32 are made of soft plastic, and the inner framework 33 is in a sheet structure and is made of metal or rigid plastic. In the process of the production, the inner framework is first put into the mold, and then the material is injected, so that the pedal body, the inner framework and the induction probe are formed at one time. As a result, the processing process is reduced, the cost is reduced, and the production efficiency is improved.

As shown in FIG. 2, a plurality of buffer columns 35 are formed on the lower surface of the pedal body 31, and the buffer column is also integrated with the pedaling body, all buffer columns are made of soft plastic, and the buffer columns will directly hit the inner housing made of aluminum. Compared with the prior art, the impact between the metal and the metal is changed with the impact between the soft plastic and the metal, which reduces the impact sound when the buffer columns are in contact with the aluminum plate, and also prolongs the service life of the device.

A number of crisscross stiffeners 36 are arranged on a lower surface of the pedal body 31, each of the buffer columns 35 is located at an intersection of the stiffeners 36, enhancing the stability of the pedal body. A height of each buffer columns 35 is smaller than a sinking depth of the pedal body 31.

As shown in FIG. 3, a housing of a balancing vehicle includes a pair of symmetrically arranged and relatively rotatable inner housings 1, a upper housing 1 is connected with an upper side of the inner housings 1, and the pedal mechanism is installed at the upper housing 2. The outer edge of the pedal body 31 is sunken downward to form a installing convex edge 312, the upper housing 2 is formed with an installation groove corresponding to the installing convex edge 312, and a plurality of first through holes 313 or threaded holes are arranged at the installing convex edge 312, the first through holes 313 or threaded holes are fixed and connected with the installation groove by several bolts or screws.

An upper surface of the installation convex edge 312 is fitted into the installation groove, and a lower surface of the installation convex edge 312 is fixed with a waterproof plate 34 by bolts or screws. A plurality of second through holes 341 or threaded holes are arranged at the waterproof plate 34. The pedal body and the upper housing are fixed and connected by a number of bolts or screws, so there is a certain gap between the pedal body and the upper housing. In order to prevent rain water flowing from the gap into the interior, a waterproof plate is added. The waterproof plate provides a guarantee for the normal operation of the internal power system.

The pedal body and the induction probe of the pedal mechanism provided by this embodiment are integrally molded. Compared with the prior art, this structure has the advantages of less multiple assembly processes, higher production efficiency, and lower production cost. At the same time, the connection between the upper housing and pedal mechanism is stable and the waterproof effect is good.

The above contents show and describe the basic principle and main characteristics of this application and the advantages of this application. The technicians of this industry shall know that this application will not be limited by the above application cases. The above application cases and specification only describe the principle of this application, and within the spirit and scope of this application, this application will have various changes and improvement, and these changes and improvement will fall into the scope of this invention that is required to be protected. The scope of this application required to be protected will be determined by the attached claims and its equivalent.

What is claimed is:

1. A pedal mechanism, wherein the pedal mechanism comprises a pedal body, an inner framework is arranged inside the pedal body, and a lower side of the pedal body is integrally formed with an induction probe for inducting a control system inside a balancing vehicle wherein an outer edge of the pedal body is sunken downward to form an installing convex edge for installing at a housing of the balancing vehicle, and the installing convex edge is fixedly connected with the housing of the balancing vehicle through a plurality of bolts or screws.

2. The pedal mechanism according to claim 1, wherein the pedal body, the inner framework and the induction probe are integrally molded by injection molding.

3. The pedal mechanism according to claim 2, wherein an upper surface of the pedal body is provided with an anti-skid stripe.

4. The pedal mechanism according to claim 2, wherein the pedal body and the induction probe are made of soft plastic, and the inner framework is in a sheet structure and is made of metal or rigid plastic.

5. The pedal mechanism according to claim 2, wherein a plurality of buffer columns is formed on a lower surface of the pedal body.

6. The pedal mechanism according to claim 1, wherein an upper surface of the pedal body is provided with an anti-skid stripe.

7. The pedal mechanism according to claim 1, wherein the pedal body and the induction probe are made of soft plastic, and the inner framework is in a sheet structure and is made of metal or rigid plastic.

8. The pedal mechanism according to claim 1, wherein a plurality of buffer columns are formed on a lower surface of the pedal body.

9. The pedal mechanism according to claim 8, wherein the lower surface of the pedal body is provided with a plurality of crisscross stiffeners, and each of the buffer column are located at an intersection of the stiffeners.

10. A housing of a balancing vehicle comprises a pair of symmetrically arranged and relatively rotatable inner housings, and an upper housing is connected with an upper side of the inner housing, the upper housing is fitted with a pedal mechanism, wherein the pedal mechanism comprises a pedal body, an inner framework is arranged inside the pedal body, and a lower side of the pedal body is integrally formed with an induction probe for inducting a control system inside a balancing vehicle;

wherein an outer edge of the pedal body is sunken downward to form a installing convex edge, the upper housing is formed with an installation groove corresponding to the installing convex edge, an upper surface of the installing convex edge is fitted into the installation groove, and a lower surface of the installing convex edge is fixed with a waterproof plate by bolts or screws.

11. The housing of the balancing vehicle according to claim 10, wherein the pedal body, the inner framework and the induction probe are integrally molded by injection molding.

12. The housing of the balancing vehicle according to claim 10, wherein an upper surface of the pedal body is provided with an anti-skid stripe.

13. The housing of the balancing vehicle according to claim 10, wherein the outer edge of the pedal body is sunken downward to form an installing convex edge for installing at a housing of the balancing vehicle, and the installing convex edge is fixedly connected with the housing of the balancing vehicle through a plurality of bolts or screws.

14. The housing of the balancing vehicle according to claim 10, wherein the pedal body and the induction probe are made of soft plastic, and the inner framework is in a sheet structure and is made of metal or rigid plastic.

15. The housing of the balancing vehicle according to claim 10, wherein a plurality of buffer columns is formed on a lower surface of the pedal body.

16. The housing of the balancing vehicle according to claim 15, wherein the lower surface of the pedal body is provided with a plurality of crisscross stiffeners, and each of the buffer column is located at an intersection of the stiffeners.

17. The housing of the balancing vehicle according to claim 15, wherein the lower surface of the pedal body is provided with a plurality of crisscross stiffeners, and each of the buffer column is located at an intersection of the stiffeners;

the outer edge of the pedal body is sunken downward to form a installing convex edge, the upper housing is formed with an installation groove corresponding to the installing convex edge, an upper surface of the installing convex edge is fitted into the installation groove, and a lower surface of the installing convex edge is fixed with a waterproof plate by bolts or screws.

18. A pedal mechanism, wherein the pedal mechanism comprises a pedal body, an inner framework is arranged inside the pedal body, and a lower side of the pedal body is integrally formed with an induction probe for inducting a control system inside a balancing vehicle;

wherein the pedal body and the induction probe are made of soft plastic, and the inner framework is in a sheet structure and is made of metal or rigid plastic.

* * * * *